United States Patent [19]

Hertel

[11] 4,190,721

[45] Feb. 26, 1980

[54] PROCESS FOR RECOVERING PROTEINS AND POLYMERS FROM LIQUIDS CONTAINING SAME

[75] Inventor: Douglas L. Hertel, Strongsville, Ohio

[73] Assignee: International Basic Economy Corporation, New York, N.Y.

[21] Appl. No.: 912,850

[22] Filed: Jun. 5, 1978

Related U.S. Application Data

[60] Division of Ser. No. 795,932, May 11, 1972, abandoned, which is a continuation of Ser. No. 590,826, Jun. 26, 1975, abandoned, which is a continuation-in-part of Ser. No. 440,196, Feb. 6, 1974, abandoned.

[51] Int. Cl.$^2$ ................................................. C08J 3/16
[52] U.S. Cl. .................................... 528/486; 528/487; 528/500
[58] Field of Search ............... 528/486, 487, 499, 500, 528/502

[56] References Cited

U.S. PATENT DOCUMENTS

| | | | |
|---|---|---|---|
| 2,459,748 | 1/1949 | Johnson | 528/502 |
| 3,303,180 | 2/1967 | Beckmann | 528/502 |
| 3,437,645 | 4/1969 | Paige | 528/499 |
| 3,583,967 | 6/1971 | Hattori | 528/487 |
| 3,761,455 | 9/1973 | Tanaka | 528/487 |

OTHER PUBLICATIONS

Mead, "The Encyclopedia of Chemical Process Equipment", Reinhold Pub., 1964, pp. & 7.
Uhl, "Mixing—Theory and Practice", Academic Press, vol. 1, pp. 118-119, 164, 279, 1966.

*Primary Examiner*—Paul R. Michl
*Attorney, Agent, or Firm*—Robert R. Jackson

[57] ABSTRACT

A dispersion or solution of a polymer or a coaguable protein (such as blood) and a coagulating or desolventizing agent for the dispersion or solution (such as an electrolyte or steam) are introduced into a localized turbulent zone of liquid, preferably formed at the tip of a high shear agitator blade operating at a tip speed of 1500 feet per minute or above, where they mix under conditions of highly efficient heat and mass transfer to produce a flowable slurry of polymer or protein particles. When the dispersion is a polymeric latex, anionic surfactant beyond that normally present in the latex is also introduced to the turbulent zone.

6 Claims, 6 Drawing Figures

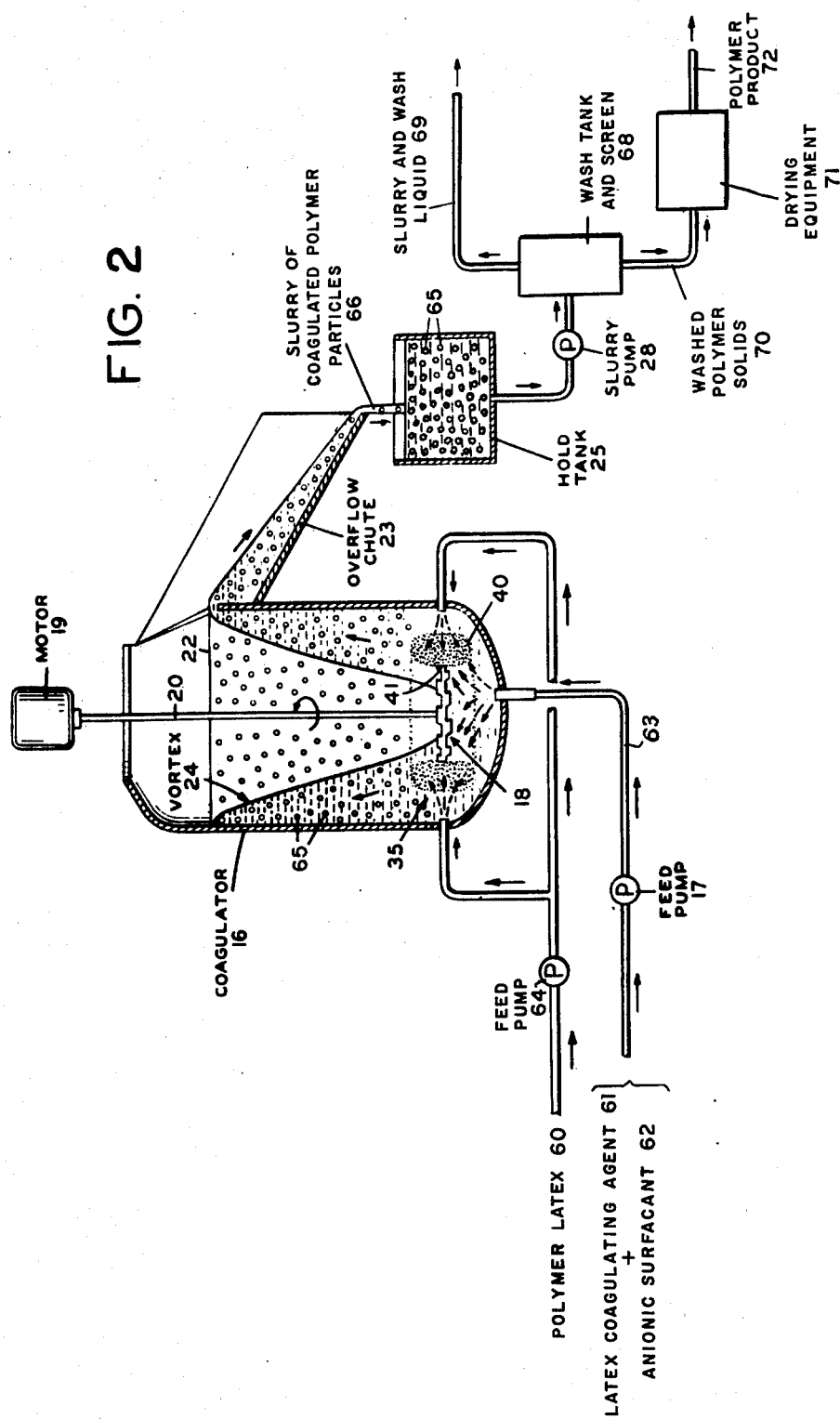

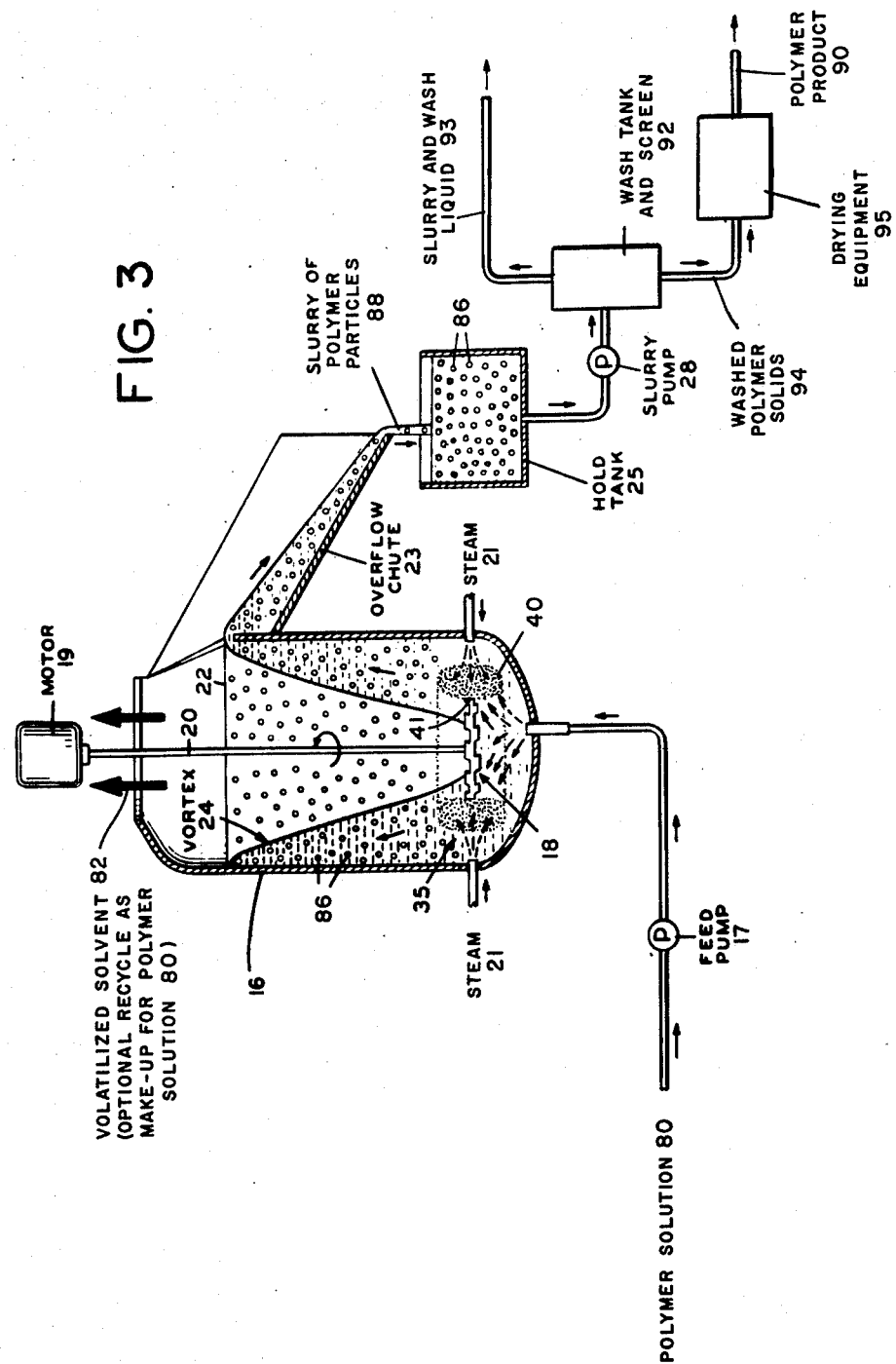

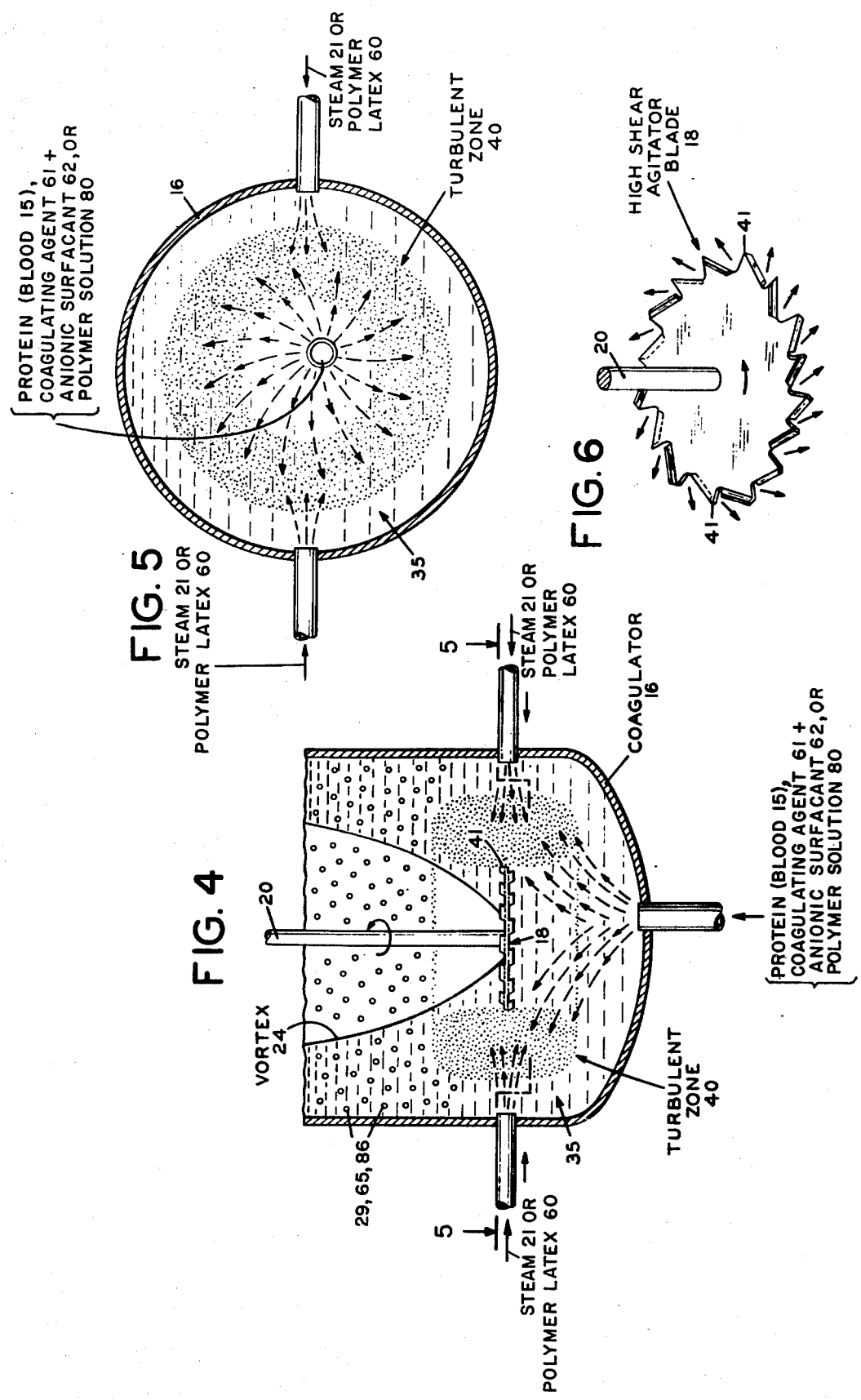

PROCESS FOR RECOVERING PROTEINS AND POLYMERS FROM LIQUIDS CONTAINING SAME

CROSS REFERENCE TO RELATED APPLICATIONS

This is a division of application Ser. No. 795,932, filed May 11, 1977, now abandoned, which was a continuation of application Ser. No. 590,826, filed June 26, 1975, now abandoned, which was a continuation-in-part of application Ser. No. 440,196, filed Feb. 6, 1974, now abandoned.

BACKGROUND OF THE INVENTION

This invention relates to a process for recovering or isolating proteins and polymers in solid form from liquids containing the same. More particularly, it relates to a process for recovering or isolating proteins and polymers from solutions, dispersions and latices of the proteins or polymers, in a controllable particle size, by a desolventizing technique or by treatment with a coagulating agent.

Proteins

Proteins arise from numerous sources and are known to be important for the proper nutrition of humans and domestic animals. Proteins also find use as soil nutrients and are widely used as fertilizers. To place the protein in a useful form, it is often necessary to extract the proteins from a suitable source material by means of a fluid, usually water. The extracted protein is dissolved or suspended in the fluid. The fluid is then heated and/or treated with various known chemicals which cause the protein in the fluid to coagulate. The system then separates into a two-phase system comprising a curd of coagulated protein and carrier fluid. The coagulated protein is separated from the fluid and dried to yield a protein product that can be conveniently handled, shipped and compounded.

One important commercial source of protein is animal blood, such as beef or pork blood which is available in large quantity and at relatively low cost from the slaughterhouses. In animal blood, the protein content is suspended in a fluid called plasma. The recovery of proteins from animal blood is of considerable commercial significance and consequently, the protein aspects of the invention are discussed primarily in terms of the coagulation of protein from whole or diluted animal blood. However, it is to be understood that the invention can be advantageously applied to the coagulation of various other coagulable proteins and that the discussion in terms of blood protein is for the purpose of illustration only.

Blood is valued for its high protein content and is a common additive in fertilizers and animal feeds. To facilitate its use in such applications, the protein is coagulated so it can be separated from the rest of the blood as described above. The separated protein is then dried to eliminate moisture which can cause the protein product to spoil. A dried product is also more convenient to handle and ship.

The art of coagulating animal blood is relatively old. In one prior process, the blood was thermally coagulated by mixing it with a hot fluid such as steam. Blood has also been coagulated by treatment with one or more of numerous chemical coagulants, including inorganic salts, strong electrolytes such as sulfuric acid, acetic acid, hydrochloric acid, and strong ionizable bases such as sodium hydroxide and lithium hydroxide. Factors such as the type and relative amounts of the coagulating agent used, and the time and temperature of the coagulation process can have a significant influence on the quality of the coagulated protein. With less severe coagulating treatments, less protein molecules are normally destroyed and hence a higher quality product is obtained. When more severe coagulating treatments are used, more protein molecules are destroyed and a lower quality product results. The higher quality protein is used as an animal feed, while the lower quality protein is used as a fertilizer.

The majority of the prior art blood coagulation processes have been batch operations. In a typical process, steam was bubbled into a tank of blood. The heat and mass transfer in such a process was usually poor. Furthermore, the blood often coagulated in such a manner that it enclosed pockets of uncoagulated blood which because of the poor heat transfer properties of the outer coagulated matter, required long residence times to complete the coagulation. The tank was emptied after the coagulation was judged to be complete and a new batch of blood was then added.

To overcome some of the problems related to batch processes for coagulating blood, several continuous processes for coagulating blood have been proposed. In one process, blood was pumped through a perforated tube and steam was injected into the blood through the perforations to cause coagulation. The perforated tube was concentric with a tube which extended downstream of the perforated tube. The length of this latter tube was chosen so that the coagulation was completed at the exit end of the tube. The coagulated product was then centrifuged for partial removal of the liquid and the centrifuge cake was dried. One disadvantage of this process was the tendency of the perforations and the tubing to become blocked with coagulated blood. This can seriously impair heat transfer from the steam to the blood, resulting in reduced coagulation capacity. Furthermore, deposition of coagulated matter on the walls of the tubing could cause blockages necessitating a shut down of the equipment to clean out the deposits and get the feed stream flowing continuously once more. Another problem often encountered with this process was non-uniform coagulation of the product in which pockets of uncoagulated blood were enclosed by coagulated matter. In the subsequent drying step, the product dried on the outside but the inside still contained moisture which could cause the product to putrefy during storage. To guard against this problem of incomplete coagulation, the blood was often pretreated with chemical coagulants in order to at least partially precoagulate the blood, thereby making it easier to achieve a complete coagulation when the steam was added. However, these chemical pretreatments are usually costly and difficult to maintain in actual practice and are, therefore, undesirable.

A process characterized by poor heat transfer is also not generally suitable for the coagulation of fresh blood. Blood is usually considered fresh when it has not yet begun to coagulate to any substantial extent. In most cases it is untreated blood three hours or less out of the animal. When the coagulation process takes place under poor conditions of heat transfer, it is often necessary to wait until the blood has partially begun to coagulate before it can be processed, so that less of a demand is placed on the coagulation system itself. Another disadvantage of a poor heat transfer process is that the blood is exposed to heating for prolonged periods of time which can cause degradation of the blood proteins. If thermally degraded blood protein was used as an animal feed supplement, it would be less nutritious to the animal than blood proteins which, during processing, were exposed to heat for only short periods of time.

In another prior art continuous coagulation process, blood was fed to a screw conveyor which moved it past a perforated area where steam injection took place. This method has many of the same disadvantages discussed above for the perforated tube coagulation process.

The coagulation processes of the prior art are generally characterized by relatively inefficient heat and mass transfer conditions. Because of this, it takes considerable time to transfer heat from its point of introduction to blood at some distant point and to bring the blood to the temperature at which cogulation is initiated. Moreover, as the blook begins to coagulate, heat transfer is further impaired since the thermal conductivity of blood decreases as coagulation proceeds and the blood becomes more viscous and changes from a liquid into a solid. Similar considerations apply to mass transfer. If a chemical coagulating agent is used, the coagulating agent must be transferred to blood distant from its point of introduction. This transfer is impaired as the blood between the point of introduction of the agent and the blood under consideration coagulates. In summary, the blood coagulates in steps with the blood closest to the point of introduction of coagulating agent coagulating first and the blood further away from the point of introduction at some time later. This stepwise process requires a relatively long period of time from initiation to completion.

A further disadvantage of prior art coagulation processes is the inefficiency of these processes in coagulating protein or blood which has been diluted with water or other diluents. Diluted blood is difficult to coagulate thermally because the diluent as well as the blood must be heated to coagulating temperatures. Furthermore, since diluted blood has a lower protein concentration, it is often difficult to coagulate the blood protein to a particle size which can be readily separated from the carrier liquid.

It is therefore an object of this invention to provide a process for coagulating, agglomerating or otherwise recovering proteins dissolved or suspended in fluids which overcomes the disadvantages of the prior art processes.

It is another object of this invention to provide an efficient process for continuously coagulating the protein in fluids such as blood into a flowable slurry of finely divided, non-sticky, coagulated protein particles.

It is another object of this invention to provide an efficient process for continuously coagulating the protein in liquids such as blood in which uniformly coagulated protein particles are produced which can be uniformly dried.

It is another object of this invention to provide a process for continuously coagulating the protein in blood and other materials in which the mass and/or heat transfer are highly efficient so that the protein is coagulated substantially instantaneously with minimal retention time and minimum heating requirements.

It is another object of this invention to provide a process for continuously coagulating the protein of fresh or aged blood, and diluted or undiluted blood.

Polymers

Coagulation also plays an important role in the recovery of many natural and synthetic polymers from liquids which contain the polymers. For example, many commercially important polymers and copolymers are produced by emulsion polymerization of the precursor monomer or monomers. Illustrative polymers manufactured by this technique include polychloroprene (neoprene), styrene-butadiene rubber, polybutadiene, polyethylene, polypropylene, acrylonitrile-butadiene copolymer, and many others known to those skilled in the art and reported in the literature. In an emulsion polymerization process, the monomer is first emulsified in an aqueous medium with an appropriate reaction catalyst. The emulsifying agent used produces a stable emulsion of the monomer or monomers in the aqueous phase. Various additives dissolved in the monomer initiate, direct and finally terminate the polymerization process, in accordance with known procedures. The ultimate product of the emulsion polymerization process is a stable colloidal dispersion of finely sized polymer or copolymer in water called a "latex".

Under normal conditions of storage and handling, a stable latex may be defined as one in which substantially no coalescence or agglomeration of the polymer particles occurs. A microscopic picture of a typical latex shows many small particles of polymers illustratively ranging from about 0.1 to 5 or more microns average diameter. Many latices have particle sizes of about 0.1 to 0.5 microns. For example, the particle size of various commercial neoprene latices is reported as varying between about 0.11 and 0.15 microns. Each discrete polymer particle is surrounded by a substantially monomolecular layer of emulsifier molecules.

Latex particles have an affinity for water, i.e., they are hydrophilic, and thus tend to attract and hold a sheath of water firmly around themselves. The colloidal latex particles also possess electrical properties that influence their behavior. For example, electrical charges on the particle surface establish an electrostatic field in which potential differences are largely due to concentration differences between the cationic and anionic species on the particle surfaces. The electrical potential at the boundary plane, i.e., the plane which divides the portion of the liquid around the particle that moves with the particle from the portion which can move independently of the particle, is called the zeta potential.

The stability of the latex depends largely upon the balance of the various attraction and repulsion forces acting on the colloidal latex particles. The attraction forces are commonly called Van der Waals forces. The repulsion forces result from the zeta potential and the bound liquid which envelopes the colloid particle.

In many cases, it becomes desirable or necessary to separate and recover the polymer from the latex in an agglomerated or concentrated form. The prior art describes numerous physical and chemical processes for concentrating or breaking polymeric latices such as centrifuging, evaporation, freezing and the addition of acids, electrolytes and other latex coagulating agents. The general objective of most of these processes is to reduce the repulsion forces between the latex particles to the extent that the attraction forces prevail. As this occurs, the latex particles coalesce to form larger ones commonly called the "polymer crumb," "rubber crumb" or "crumb" which are more easily separated from the system. The separated particles are then normally conveyed to dewatering equipment such as screw presses or dewatering screens for ultimate recovery of the dried or dewatered polymer.

In general, it is desirable to coagulate a latex to a particle size which can be readily transported in the conveying system and handled in the dewatering equipment. If the coagulated particles are too small, they may not convey properly. They can also pass through the openings in dewatering screens and/or disappear with the effluent from the screw presses. On the other hand, if the coagulated particles are too large there may be conveying and handling problems of a different type, e.g., blockages, as well as insufficient drainage from the particles. The inclusion of uncoagulated material is also a serious problem with large particles. In addition, if there is excessive variation in particle size, it becomes difficult to uniformly dewater and dry the particles. These problems can be overcome or minimized if the latex particles are coagulated to a controlled particle size.

The prior art describes numerous techniques for coagulating latices. For example, many latices can be coagulated to a controlled paticle size by the addition of one or more electrolytes. See, for example, U.S. Pat. Nos. 2,366,460, 2,385,688, 2,386,449, 2,393,208, 2,393,348, 2,408,128, 2,459,748, 2,469,827, 2,476,822, 3,053,824 and 3,498,935. The electrolyte is believed to cause particles to coalesce by reducing the thickness of the layer of bound water on the latex particle and/or by reducing the zeta potential.

The coagulation usually takes place in a batch or continuous coagulator in which the latex and coagulant are mixed. The recovered polymer crumb is then washed to remove electrolyte remnants. The washing step is important since high levels of electrolyte or other contaminants in the crumb may adversely affect processability of the polymer or result in an unacceptable product.

In many cases, however, the addition of electrolyte to the latex produces large lumps or agglomerations of polymer which do not have a high enough surface area or porosity to permit effective washing out of the electrolyte. These lumps may also contain uncoagulated latex, and often cannot be readily conveyed or dewatered. The problem of lumping, for example, is particularly prevalent with polychloroprene (neoprene) latices which consist of relatively small hydrophilic particles having a strong negative charge. The polychloroprene latex particles exhibit vigorous Brownian movement which causes a rapid "chain-reaction" during coagulation, with the result that undesirably large agglomerates of coagulated polychloroprene tend to be formed. In short, polychloroprene coagulation is very sensitive and difficult to control.

To minimize the problems of uncontrolled coagulation of latex particles into large relatively unporous lumps, several processes have been proposed. For example, M. A. Youker, in his article "Continuous Isolation of GR-M From Latex," *Chemical Engineering Progress* ("*Trans. Section*"), Vol. 43, No. 8, pp. 391–398 (August 1947), describes a process in which a polychloroprene emulsion is broken by freezing the latex as a thin sheet. During the subsequent washing step, the frozen water in the sheet melts and leaves a porous structure which allows for effective washing of the sheet. One disadvantage of this technique is a low production rate compared to conventional coagulation techniques. See also British Pat. No. 876,283 which alludes to the difficulties of coagulating polychloroprene and natural rubber using electrolytes, and proposes to solve the problem by using as the coagulating agent an aqueous solution containing several different types of electrolytes.

Many commercially important polymers and copolymers are also made by a solution polymerization techniques as opposed to the emulsion polymerization technique just described. Illustrative polymers and copolymers manufactured by solution polymerization include polyisoprene, polybutadiene, natural balata rubber, styrene-butadiene rubber and others well known to those skilled in the art and described in the literature. In solution polymerization, the monomer or monomers and the additives which initiate, direct and terminate the polymerization are dissolved in a liquid, usually an organic liquid, in which the polymer product is soluble. The polymerization takes place in the liquid to produce a solution illustratively containing about 1 to 50% dissolved polymer. As with emulsions and latices, it often becomes necessary to recover and isolate the polymer or copolymer from the solution.

Various methods have been disclosed for recovering and isolating the dissolved polymer from such solutions. See, for example, U.S. Pat. Nos. 2,530,144, 2,561,256, 2,607,763, 2,833,750, 2,844,569, 2,957,855 and 2,957,861. In one common technique, the polymer solution is treated with a desolventizing agent, such as steam or hot water, which is substantially immiscible with the solution solvent and in which the polymer is substantially insoluble. The desolventizing agent heats the polymer solution to the point where the solvent volatilizes. As desolventizing occurs, the polymer comes out of solution in the form of solid particles which agglomerate into longer particles. The end result is a slurry consisting of polymer particles and liquid desolventizing agent, from which the polymer is recovered.

The desolventizing usually takes place in a continuous or batch process in which the polymer solution and desolventizing agent are mixed at atmospheric pressure or under vacuum. For economic reasons the vaporized solvent is normally condensed, recovered and recycled as make-up solvent to the polymerization process.

The problems discussed above with regard to the recovery and isolation of polymers from latices are also encountered in the recovery and isolation of polymers from solution by desolventizing. The formation of unduly large lumps or aggregates of polymer, for example, can be a serious problem, as discussed above. Thus the objective is to desolventize the polymer solution in such way as to yield a polymer of controlled particle size in order to facilitate handling, washing and drying of the polymer. In addition, the recovery of polymers from solution or from a latex is generally plagued by problems of heat and mass transfer similar to those discussed above in connection with the coagulation of blood. The coagulating and desolventizing agents must first reach the polymer particles or the bulk of the solvent before effective coagulation or desolventizing can occur. Heat transfer is a particular problem in the desolventizing of polymer solutions where the thermal energy carried by the desolventizing agent must transfer to the solvent once the desolventizing agent reaches the bulk of the solvent in order to initiate volatilization of the solvent. The high energy requirements of desolventizing are a significant drawback of such processes. A polymer recovery process which operated at low retention times and low energy requirements would be most desirable.

It is therefore also an object of this invention to provide a process for recovering a polymer dissolved or suspended in a liquid which overcomes the disadvantages of the prior art processes.

It is another object of this invention to provide an efficient process for continuously recovering or isolating a polymer from latices and solutions of the polymer in the form of a flowable slurry of polymer particles, by the use of desolventizing and coagulation techniques.

It is another object of this invention to provide an efficient process for continuously recovering a polymer from latices and solutions of the polymer in the form of uniformly coagulated particles which can be uniformly washed of contaminants to produce a final product of acceptable quality.

It is another object of this invention to provide a process for continuously recovering a polymer from latices and solutions of the polymer in which the mass and/or heat transfer are highly efficient so that the polymer is recovered substantially instantaneously with reduced retention time and reduced overall heating requirements, thereby providing a process having a practical and economical high rate of polymer recovery and production.

These and other objects of this invention will be apparent to those skilled in the art upon a consideration of this entire disclosure.

SUMMARY OF THE INVENTION

The above objectives are accomplished by forming a localized turbulent zone within a mass of liquid, preferably by agitating a mass of liquid with a high shear agitator blade to produce in the liquid a turbulent zone at the tip of the agitator blade, and introducing into the localized turbulent zone (1) a dispersion or solution of a polymer or a coaguable protein, and (2) a coagulating agent or a desolventizing agent, as the case may be, provided that when a dispersion of a polymer is introduced into the turbulent zone, the process includes the further step of introducing into the turbulent zone an anionic surfactant above and beyond any surfactant which may normally be present in the latex.

The polymer or protein and the coagulating or desolventizing agent are separately introduced to the system at a point which insures that a substantial portion of each enters the turbulent zone and passes through it before emerging from the system. The polymer or protein and the coagulating or desolventizing agent mix in the zone of high turbulence under conditions of highly efficient heat and mass transfer so that almost instantaneously, a highly efficient production of polymer or protein particles takes place in the zone as the result of coagulation or desolventizing. The polymer or protein is produced as a flowable slurry of finely divided particles whose size can be controlled by varying the speed of the agitator blade.

It has been found that by directing the polymer or protein and the coagulating or desolventizing agent to the localized highly turbulent zone, mixing, heat and mass transfer, and coagulation or desolventization take place in a highly advantageous environment. The particles of polymer or protein which are formed in the zone are small and discrete. These particles are suspended in the carrier liquid and form a readily flowable slurry which facilitates the continuous nature of the process. The process can be operated continuously by continuously feeding the polymer or protein and the coagulating or desolventizing agent into the zone of highly turbulent flow and continuously withdrawing a slurry of polymer or protein particles.

For the case where a polymeric latex is being coagulated, it becomes necessary to also introduce an anionic surfactant into the turbulent zone in order to minimize agglomeration of the coagulated polymer particles into larger and larger particles. The presence of the anionic surfactant during coagulation provides a control on the degree to which the polymer particles coagulate and agglomerate, by which the resultant particles remain small and discrete and within desired ranges of particle size. The anionic surfactant is believed to stabilize particle growth by reducing the interfacial tension of the particles.

It has further been found that because of the highly efficient nature of the process, the liquid containing the polymer or protein can be diluted substantially without adversely affecting the coagulation process. One advantage in diluting the fluid is that the resulting slurry becomes even more flowable and, therefore, can be more readily handled on a continuous throughput basis. Furthermore, because of the highly efficient mixing in the process of this invention, the protein need not be partially precoagulated and thus, fresh blood, for example, can also be processed. Since substantially all the polymer or protein and coagulating or desolventizing agent pass through the zone of highly turbulent flow, a product is obtained which, following the drying or dewatering step, is without any moisture pockets of uncoagulated or partially coagulated material which could cause spoilage of the end product or other undesirable results. Complete and uniform drying, dewatering and washing of the polymer or protein product recovered from the process is facilitated by the ability to control the particle size of the recovered material within prescribed desired ranges. Complete and uniform drying or dewatering is also facilitated by the non-sticky nature of the recovered particles. And because the particles are not sticky, there is no build-up or sticking of the particles to the internal dryer walls or to other processing equipment and, therefore, the drying capacity of the dryer and the functioning of other processing equipment is not impaired.

The process of this invention can be used to continuously and efficiently recover by coagulation or desolventization a wide variety of polymers or proteins dissolved or suspended in a variety of liquids to produce a flowable product slurry in which the recovered polymer or protein is present as uniformly sized, non-sticky particles of high quality which can be readily separated from the slurry and completely and uniformly dried, dewatered, washed or otherwise treated. The small particle size of the recovered particles and the non-sticky nature of the particles provides a flowable product slurry which overcomes the problems of flow stoppages caused by plugging with solids, a major problem with many continuous polymer or protein recovery systems of the prior art.

The size of the recovered polymer or protein particles can be controlled as desired, without affecting the production rate of final product, by varying such parameters as the type of coagulating agent, the extent of dilution of the dispersion or solution being treated, the amount of anionic surfactant, the speed of the agitator blade, and the like.

The invention is more specifically described below in conjunction with the accompanying drawings.

BRIEF DESCRIPTION OF THE DRAWINGS

FIG. 2 is a schematic flow sheet of a preferred embodiment of the polymer coagulation aspect of the invention.

FIG. 3 is a schematic flow sheet of a preferred embodiment of the polymer desolventization aspect of the invention.

Figure 1:
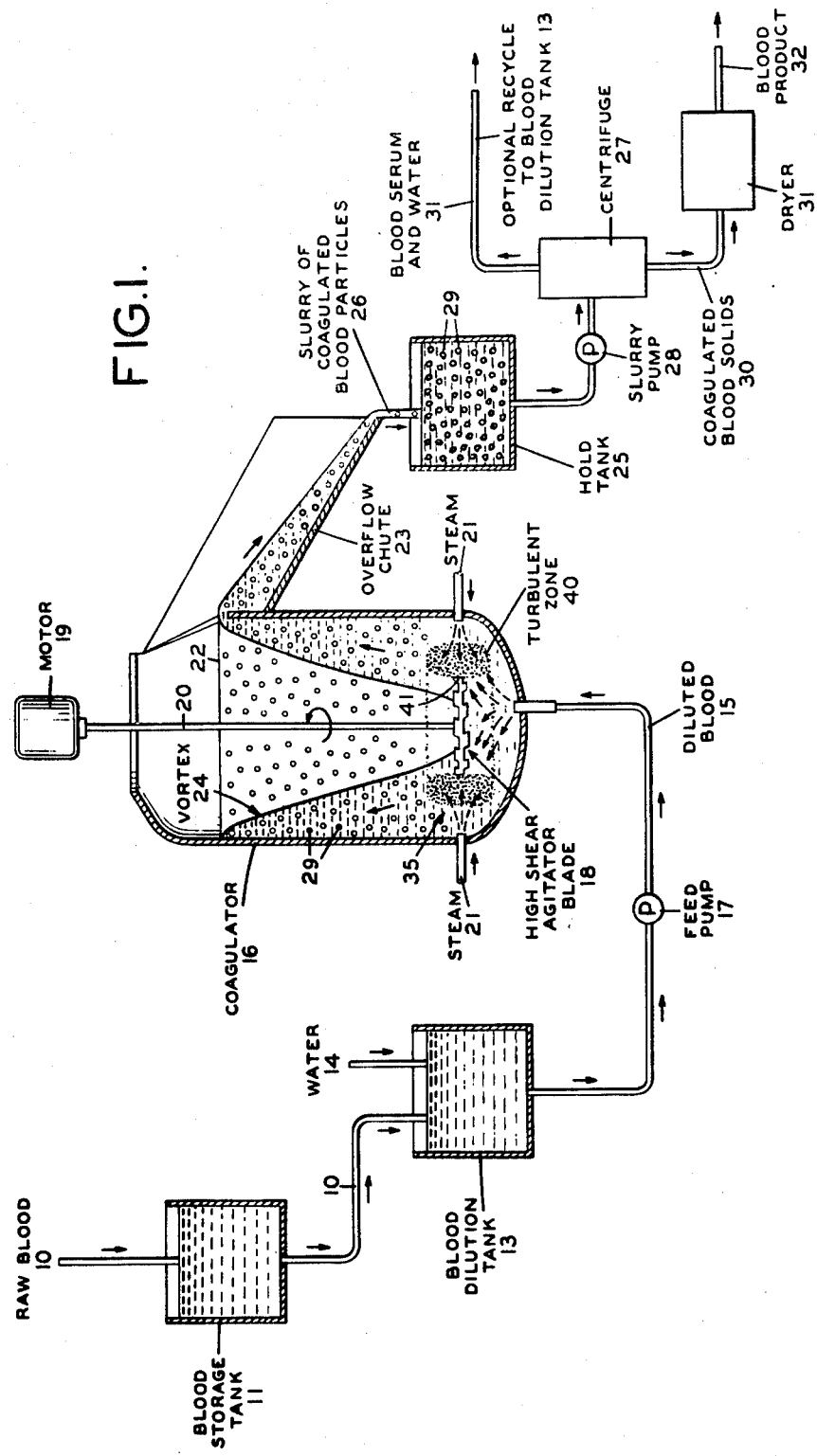
FIG. 1 is a schematic flow sheet of a preferred embodiment of the protein coagulation aspect of the invention.

Common identifying numerals have been used in FIGS. 1, 2 and 3 wherever possible.

FIG. 4 is an enlarged schematic view of the bottom of the coagulator vessel of FIGS. 1, 2 and 3 which more clearly illustrates the location of the turbulent mixing zone and the introduction of the polymer or protein and the coagulating or desolventizing agent into the zone.

FIG. 5 is a sectional view taken generally along the line 5—5 of FIG. 4 which schematically illustrates the generally toroidal configuration of the turbulent zone and the introduction of the polymer or protein and the coagulating or desolventizing agent into the zone.

FIG. 6 is a perspective view of a high shear agitator blade suitable for use in the process of the invention.

DESCRIPTION OF THE PREFERRED EMBODIMENTS

Protein Coagulation

Referring to FIG. 1, untreated, raw whole animal blood 10 (100% blood) is introduced into the blood storage tank 11 which supplies the process. This blood is preferably beef, lamb, pork, or poultry blood obtained from a slaughterhouse and can be fresh (less than three hours out of the animal) or aged blood. Raw whole blood contains about 80 to 85% water. However, the blood 10 can also be slaughterhouse blood which has been diluted to some extent with floor washings or other diluents. Although animal blood is a preferred source of coagulable protein, other fluids containing coagulable proteins can also be coagulated in the process of this invention, such as, for example, soya bean, cotton seed and coconut extractions, sweet and acid whey from cheese plants, and juices such as those of the alfalfa, seaweed and water hyacinth plants.

The blood from tank 11 is transferred to a dilution tank 13 where it is mixed with water 14 or another suitable inert liquid diluent such as the blood serum or water separated from the coagulant product later in the process. Generally, enough diluent is added to form a mixture containing up to a maximum of about 50% added diluent. As discussed above, the diluent imparts added flowability to the product slurry of coagulated protein which is important for the continuous operation of the process.

If the blood from the slaughterhouse is already diluted, it may be possible to eliminate the dilution step or to reduce the extent of dilution. The dilute blood preferably contains up to about 60 to 90% raw blood and about 10 to 40% added water or diluent and even more, preferably about 75 to 85% raw blood and about 15 to 25% added water or diluent. As more water is added to the raw blood, more heat is needed to bring the mixture up to the protein coagulation temperature. The addition of excessive amounts of water to the raw blood is not economically desirable.

The diluted blood 15 is transferred to a coagulator vessel 16 by feed pump 17. In a preferred embodiment, the coagulator is a cylindrical tank provided with a high shear agitator blade 18 which is connected to a driving motor 19 by shaft 20. The blade 18 can be selected from numerous conventional mixing blades which are specially designed to produce a high degree of turbulence. Generally, such blades are described as high shear impellers and are known to those skilled in the art. They are usually designed to operate at high speeds but with minimal liqid flow as compared to other type blades in which a major amount of the mechanical energy transmitted to the blade is used to circulate the liquid. These blades are generally characterized by a small blade area in comparison to the more commonly used mixing blades. The so-called "modified disk" impeller having a sawtooth design on the rim of a disk has been found effective. The commercially available Cowles high shear standard impeller is an example of a suitable modified disk agitator blade.

As shown in FIG. 1, the diluted blood 15 is continuously introduced into the bottom of the coagulator 16 below blade 18. The preferred coagulating agent is steam 21 which is continuously introduced through the walls of coagulator 16 at two points about 180 degrees apart and at a height generally approximating that of blade 18. Any suitable protein coagulating agent or combination of coagulating agents, with or without steam, can be used, although steam without any additional coagulating agents is preferred.

As blade 18 rotates, it agitates the mass of fluid in the coagulator and creates a vortex 24. The top of the coagulator is provided with an overflow device 23 (see FIG. 1) which communicates with the interior of coagulator 16. The top 22 of the vortex 24 spills over continuously into overflow device 23 and is collected in hold tank 25. The vortex overflow through overflow device 23 is a flowable slurry 26 of finely sized coagulated blood particles 29. The slurry 26 is sent to a centrifuge 27 by slurry pump 28 where the coagulated blood solids 30 are separated from the blood serum and water 31 which can then be recycled if desired to serve as the diluent for the blood. Other suitable means for separating solids from a liquid can also be used for this operation such as, for example, filters of various sorts or gravitational settling apparatus. The blood solids 30 are then sent to a dryer 31 where they are dried in accordance with conventional procedures to produce a dried blood product 32, suitable for addition to fertilizers, animal feeds or other compositions in which coagulated blood is a useful ingredient.

To produce the desired turbulent flow conditions in coagulator 16, blade 18 illustratively rotates with a tip speed of at least about 1500 feet per minute and generally about 1500 to 6500 feet per minute. Tip speed in feet per minute is computed by multiplying the circumference of the agitator blade (expressed in feet) by its revolutions per minute. Preferred tip speeds are about 4800 to 5400 feet per minute since it has been generally found that these speeds produce a well coagulated flowable slurry of desirable particle size. The conditions of highly turbulent flow in coagulator 16 maintain the desired flowable consistency of the slurry of coagulated particles, prevent the formation of large agglomerates of coagulated particles, and produce a substantially instantaneous coagulation of the protein. If the tip speeds of blade 18 become too low, the degree of turbulence is reduced below that required for the rapid mass and heat transfer. The size of the coagulated particles can then become excessively large and interfere with the continuous nature of the process by tending to make the product slurry less flowable. On the other hand, if the tip speeds become too high, there is insufficient growth of the coagulated particles and the coagulated particles are too finely sized making them more difficult to separate from the slurry 26.

Particle size of the coagulated blood particles 29 is controlled by the tip speed of blade 18, with lower tip speeds producing larger particles and higher tip speeds producing smaller particles. Illustratively, the coagulated blood particles 29 are almost spherical in shape and have an average particle diameter of about 0.020 to ⅛ inch. A preferred particle size range is about 1/16 to ⅛ inch, and this range is normally obtainable with tip speeds of about 4800 to 5200 feet per minute. Particles sized below about 0.020 inch can become difficult to efficiently separate from the blood serum and water. On the other hand, with particles larger than ⅛ inch, drying times can become excessively long.

As blade 18 rotates, it produces in the bulk of liquid present in coagulator 16 a small localized zone of highly turbulent flow 40 in proximity to the tip 41 of blade 18. As best shown in FIG. 4, zone 40 has the approximate configuration of an ellipse when viewed in cross section as in FIGS. 1 and 4, with the zone extending outwardly from, and above and below, the tip 41 of blade 18. Although the precise boundaries of zone 40 are somewhat diffuse, it illustratively extends outwardly from tip 41 a distance equal to approximately ½ the diameter of blade 18. The extent of zone 40 above and below blade 18 is also illustratively about ½ the diameter of blade 18. Thus, if the diameter of blade 18 was 4 inches, zone 40 would illustratively extend outwardly from tip 41 about two inches and would further extend upwardly from tip 41 about two inches and downwardly from tip 41 about two inches for a total vertical dimension as viewed in FIG. 4 of about four inches. When viewed from above, zone 40 has a generally toroidal configuration as shown in FIG. 5. In the embodiment shown in the drawings, it is apparent that zone 40 occupies only a minor amount of the mass of liquid contained in coagulator 16.

The diluted blood 15 is introduced into the coagulator below blade 18 and slightly off center of the coagulator bottom while the stream is introduced through the walls of the coagulator in proximity to the tip 41 of blade 18. The action of blade 18 draws the blood 15 upwardly and outwardly from its point of introduction as shown schematically by the arrows in FIGS. 4 and 5. The steam 21 is injected directly into zone 40 as shown schematically by the arrows in FIGS. 4 and 5. The steam and blood are each injected into the coagulator separately under sufficiently high pressure to insure penetration of a substantial amount of each into zone 40 where they mix under conditions of highly efficient heat and mass transfer to substantially instantaneously coagulate the blood. Under such conditions, particle size is controlled, excessive growth of particles is prevented and the product slurry 26 remains in a flowable condition in which it can be continuously and conveniently withdrawn from the coagulator.

Blade 18 is disposed in the coagulator between the blood inlet port and the overflow device 23 by which the coagulated blood particles leave the coagulator. If blade 18 is located too far from the blood and steam inlet ports, it provides less turbulence in the zone where the steam and blood mix, and the mixing of the two is not substantially instantaneous. Under such conditions, the particles of coagulated blood can agglomerate and grow and cause the coagulator and its inlets and outlet to become plugged with coagulated blood. On the other hand, if blade 18 is too close to the blood inlet port, incomplete coagulation may result because of bypassing of the turbulent zone with the result being poor mixing between the steam and blood. Illustratively, the distance between the blood inlet port and the agitator blade should be about 0.25 to 1.25 times the blade diameter with distances toward the lower and middle end of the range preferred for larger diameter blades. For example, with a 4" blade the distance is illustratively about 1 to 5 inches while for a larger 12 inch diameter blade, the distance can range from about 3 to 8 inches.

The steam is illustratively injected through the coagulator well at a point substantially level with the plane of the agitator blade.

The gap 35 between the outer edge of zone 40 and the wall of the coagulator (see FIGS. 1, 4 and 5) should not be large enough to permit a substantial amount of the injected blood and steam to escape upwardly through the vortex 24 without passing through zone 40. While a gap can exist between zone 40 and the wall, it should not be unduly large since an objective of the invention is to introduce as much of the steam 21 and blood 15 into zone 40 as possible so that a significant portion of the introduced blood and steam finds itself in zone 40 at some time before it exits the coagulator through overflow device 23. In this regard, the diameter of blade 18 is illustratively at least about 30%, and preferably about 35 to 60%, of the diameter of coagulator 16 so that the turbulent zone 40 occupies at least about 40%, and preferably about 55 to 100%, of the distance between the tip 41 of blade 18 and the wall of the coagulator 16.

The coagulator 16 illustratively has a height dimension (to the point where slurry 26 enters the overflow chute 23) of about 1 to 3, and preferably about 1.5 to 2.5, times the diameter of the coagulator.

If the temperature of the blood mixture in the coagulator falls below about 185° F., incomplete coagulation can result. Illustratively, temperatures between about 185° F. and the boiling point of the mixture are satisfactory, with temperatures of about 190°–205° F. generally preferred for most applications. Residence times in the coagulator are illustratively about 15 to 35 seconds with longer times required at lower treatment temperatures and shorter times required at higher treatment temperatures. Because of the short residence times, the high temperature present in the coagulator does not appreciably degrade the protein in the blood and consequently the blood product has a higher percentage of usable protein than many prior art processes which expose the blood to high temperatures for long periods of time because of poor heat transfer conditions.

The feed rates of steam and blood are adjusted during startup of the process until the desired stable, steady state operating temperature is obtained in the coagulator. Too high a blood feed rate can lower coagulator temperatures causing incomplete coagulation. Too low a blood feed rate can cause excessive retention times in the coagulator and can result in the production of excessively fine blood particles which can become difficult to separate from slurry 26. As will be understood by those skilled in the art, suitable blood and steam feed rates can vary widely depending upon such illustrative factors as the size and shape of the coagulator, the extent to which the blood is diluted, steam temperatures and the nature and speed of the blade 18.

If excessively high steam pressures are used, the steam may blow through the vortex 24 and cause the coagulator contents to scatter. On the other hand, if steam pressure is too low the steam may not penetrate zone 40 resulting in incompletely coagulated blood because of an insufficient thermal input. Preferred steam pressures produce completely coagulated blood at temperatures in the range of 190°–205° F. Steam pressures of about 10 to 50 psig have been found suitable.

Polymer Latex Coagulation

Coagulation of a polymer latex is carried out in a manner substantially similar to that just described for blood except that an anionic surfactant must additionally be introduced to the turbulent zone 40 in the coagulator.

Referring now to FIG. 2, a polymer latex 60 is continuously introduced into coagulator 16, at about the level of the high shear agitator blade 18, by the latex feed pump 64. The coagulator vessel 16 (including overflow chute 23) and high shear agitator blade 18 are substantially the same in all respects as previously described for the blood coagulation embodiment.

Latex 60 is illustratively a stable aqueous emulsion, suspension or dispersion of finely sized polymer particles, typically having a solids content of about 20 to 60% by weight. The particle sizes of the substantially uniformly dispersed polymer particles range, by way of example, from about 0.1 to 5 or more microns average diameter.

Latex 60 is preferably one prepared by emulsion polymerization techniques, and usually includes small amounts of one or more surfactants which are present to stabilize the latex, in accordance with procedures well known to those skilled in the art. The role of the surfactant in a polymer latex produced by emulsion polymerization is discussed in detail in *Surface Active Agents and Detergents*, Vol. II, A. M. Schwartz, et al., Interscience, pp. 671–680 (1958). The amount of stabilizing surfactant present in the latex is known to vary widely, e.g., from about 1 to 10 parts by weight per 100 parts of polymer solids, depending upon such factors as the type of polymer involved, the solids content of the latex, and the particular emulsion polymerization reaction scheme employed. The nature and type of the latex surfactant can also vary widely for generally the same reasons, with the more common stabilizing surfactants normally found in polymer latices well known to those skilled in the art. The anionic, cationic, and non-ionic surfactants, for example, have been used, although many of the more important commercial latices are stabilized by anionic surfactants.

The chemical nature of the polymer is not considered to be of particular criticality insofar as the present invention is concerned. Thus, any of the common polymeric latices can be effectively coagulated by the process of the invention. This includes latices of natural and synthetic polymers such as polychloroprene, polybutadiene, acrylonitrile-butadiene copolymers, acrylonitrile-butadiene-styrene copolymers, silicone rubber, polyethylene, polypropylene, polyurethane and the like. The invention can be usefully applied with latices of thermoplastic, thermosetting, elastomeric or non-elastomeric polymers. One preferred latex is an emulsion polymerized polychloroprene latex containing about 30 to 40% by weight solids and having an average polymer particle size between about 0.11 and 0.15 microns. The polychloroprene latex can be any of the commonly encountered types such as G, W or WRT types. Polychloroprene latices are especially difficult to coagulate by prior art techniques because of the difficulties in stopping the coagulation once it starts. However, the polychloroprene coagulates into discrete, substantially evenly-sized and shaped particles of controllable size in the coagulation process of this invention.

The latex coagulating agent 61 and the excess anionic surfactant 62 (see FIG 2) are continuously introduced, beneath the agitator blade 18, into the turbulent zone of the coagulator, preferably as a single flow stream 63, by feed pump 17. However, the coagulating agent 61 and anionic surfactant 62 could also be introduced as two separate streams into the turbulent zone 40 within the coagulator. What is important is that the coagulating agent 61 and excess anionic surfactant 62 be present in the turbulent zone 40 to intimately contact and mix with the latex 60.

The coagulating agent 61 may be any material which has the capability to break or destabilize the latex and coagulate the individual latex particles into larger particles 65 (see FIG. 2). The mechanism by which various ltex coagulating agents coagulate the latex, as well as the numerous coagulting agents available for coagulating the various latices, are well known to those skilled in the art, and need not be repeated in detail herein. If suffices to state that one common class of latex coagulating agents include electrolytes and ionizable substances such as inorganic acids, bases and salts. For example, salts of the alkali and alkaline earth metals (e.g., sodium, potassium, lithium, calcium, magnesium, barium), aluminum, iron, silver, nickel, cobalt, titanium and the like are well known latex coagulating agents. The halogen and sulfate salts of such metals are widely used. Salts of polyvalent metallic cations are particularly preferred. The salts ionize in the latex and neutralize the charge of the latex emulsifying agent. This breaks or destabilizes the emulsion by permitting the individual latex particles to coalesce. Strong or weak electrolytes can be used depending upon such factors as the degree of stability of the latex. Other factors such as the temperature of the latex may also govern the choice of coagulating agent.

One or more coagulating agents can be mixed with the latex, although preferably only a single coagulating agent is used. Magnesium sulfate, aluminum sulfate, barium chloride or other salts of low electrical conductivity is preferred coagulating agents, particularly in the case of a polychloroprene latex since polychloroprene is widely used as electrical insulation. Since some residual coagulating agent, e.g., about 10 to 50 p.p.m., is normally left in the finished polymer product, materials such as magnesium sulfate, aluminum sulfate and barium chloride have the advantage of being poorer conductors of electricity than some of the other common coagulating agents such as sodium chloride, for example.

The quantity of coagulating agent used can depend on a number of factors, with the temperature of the latex being one major factor. For example, lower latex temperatures generally require lower levels of coagulating agent, and vice-versa, because of reduced surface tension at the lower temperatures. Polymer latices are illustratively coagulated at temperatures of about 32° to 212° F., and preferably in the ambient temperature range of about 60° to 100° F.

The coagulating agent 61 is preferably supplied to the turbulent zone 40 in the form of an aqueous solution normally containing about 1 to 10%, and preferably about 4 to 6%, by weight coagulating agent. The coagulating agent is introduced to the coagulator in an illustrative amount of about 0.02 to 0.5, and preferably about 0.05 to 0.25, pounds per pound of latex solids on a dry basis. Enough coagulating agent must be added to at least initiate coagulation of the latex. Excess coagulating agent can be used, but normally would be avoided for reasons of economy and for better control of the coagulation. By way of example, about 0.08 to 0.18 pounds of aluminum sulfate or magnesium sulfate per pound of polymer solids have produced satisfactory coagulation of polychloroprene latices.

Anionic surfactant 62 is a deliberate addition to the coagultor 16 of surfactant above and beyond surfactant of any type which may normally be present in the polymer latex 60. This excess anionic surfactant is necessary in order to prevent undue agglomeration of the coagulated polymer particles 65 into lumps, large balls or the like which snarl equipment, and become difficult to wash, dry and handle. It has been found that among the numerous surfactants availabe, it is only the anionic family of surfactants which exhibits a satisfactory control on the growth of particles 65.

The excess anionic surfactant 62 is preferably mixed with the coagulating agent 61 prior to its introduction into the turbulent zone 40 of the coagulator, as shown in FIG. 2. However, the excess surfactant could be added to zone 40 as a separate stream, or it could be added to the latex 60 before the latex was introduced into the coagulator, provided it did not adversely effect the stability of the latex.

An anionic surfactant, as used herein, is any compound, usually at least partly in an organic nature, which encompasses within the same molecule two dissimilar structural groups—a water-soluble or hydrophilic group and a water-insoluble or hydrophobic group, and whose water-soluble group is a polar group which is negatively charged in aqueous solutions or dispersions.

The particular type of anionic surfactant 62 utilized is not believed to be of critical significance. The four main sub-classes of the anionic surfactant family, all of which are useful in the present invention, are those in which the polar group is a carboxylate, sulfonate, sulfate or phosphate ester.

The carboxylates have the general formula, $(RCOO)^- M^+$ where R is normally a $C_9$ to $C_{21}$ alkyl group and M is a metallic or amine ion such as $Na^{+1}$, $K^{+1}$, $Mg^{+2}$, $Ca^{+2}$, $Ba^{+2}$, $Fe^{+2}$, $Al^{+3}$, preferably a monovalent ion. Illustrative carboxylates include such materials as the N-acylsarconsinates and arcylated protein hydrolysates.

The sulfonates have the general formula, $RSO_3Na$, where R is normally a hydrocarbon group such as an alkyl or alkylarylene group in the surfactant molecular weight range, e.g., $C_9$ to $C_{21}$. The sulfonates include the alkylbenzenesulfonates, petroleum sulfonates, sulfosuccinates, and napthalenesulfonates. The sodium salt of linear dodecylbenzene sulfonate is a common sulfonate anionic surfactant.

The sulfates are probably the most widely used anionic surfactants and have the general formula, $ROSO_3M$, where R is an alkyl or alkylarylene group in the surfactant molecular weight range and M is an ion as defined above for the carboxylates. Illustrative sulfates include sulfated natural fats and oils, sulfated oleic acid, sulfated alkanol amines, sulfated esters, sulfated poly- oxyethylene alkylphenols and alkylpolyoxyethylene sulfates. Sodium lauryl sulfate is common member of the family and is one preferred anionic surfactant for use in the invention.

The phosphate esters include such materials as alkyl orthophosphates, alkyl polyphosphates and ethoxylated phosphate esters.

Additional anionic surfactants suitable for use as surfactant 62 are described in even greater detail in such publications as the *Kirk-Othmer Encyclopedia of Chemical Technology*, 2nd ed., Vol. 19, pp. 512–531, Interscience (1969); *Surface Active Agents*, A. M. Schwartz, et al., pp. 25–148, Interscience (1949); and *Surface Active Agents and Detergents*, Vol. II, A. M. Schwartz, et al., pp. 25–102, Interscience (1958); said publications incorporated herein by reference.

The amount of anionic surfactant 62 can vary widely depending upon such factors as the type of latex involved and the size and type of coagulated particles 65 desired. If too little surfactant is used, the coagulated particles can become excessively large. If too much surfactant is used, not only may the coagulated particles be too small, but the surfactant can unduly contaminate the coagulated polymer. As pointed out above, low contamination levels in the finished polymer are important in many applications and, for this reason, no additives than necessary are normally used in the coagulation. Illustratively, enough excess anionic surfactant 62, above and beyond that normally present in the latex 60, is introduced into the turbulent zone 40 to provide about 0.02 to 0.2, and preferably about 0.04 to 0.1, pounds per pound of latex solids on a dry basis. The surfactant is preferably added as an aqueous solution typically containing about 1 to 5%, and preferably about 1 to 3%, surfactant.

In the preferred embodiment shown in FIG. 2, the coagulating agent 61 and excess anionic surfactant 62 are dissolved in water and the resulting aqueous solution 63 containing both additives is then introduced into the turbulent zone 40 of the coagulator. Illustratively, solution 63 is introduced to zone 40 under steady state operating conditions at a volumetric rate of about 5 to 12, and preferably about 5 to 10, times the rate at which the latex 60 is being introduced. This assures production of the vortex 24 which permits efficient operation of the coagulator on a continuous basis. If the ratio falls below about 5, the product slurry 66 could in some cases become overburdened with coagulated solids, possibly causing such problems as vortex destruction, loss of high turbulence in zone 40 and overloading of the agitator drive motor 19. If a ratio above 12 was used, the process could be operated satisfactorily, but would tend to be less efficient because of the increased volume of material being processed.

The various other process and equipment parameters discussed above, such as agitator blade speed, blade tip speeds, blade diameter, clearance between the agitator blade and coagulator walls, points of introduction of latex, coagulant and anionic surfactant, residence times, the dimensions and shape of zone 40, etc. are substantially the same as described above in connection with blood coagulation.

A major part of the latex 60, coagulating agent 61 and anionic surfactant 62 is introduced into the localized turbulent zone 40 at the tip agitator blade 18 where they intimately mix under highly diffusive mass transfer rates so that coagulation and agglomeration of the latex particles takes place substantially instantaneously, and does not proceed further during subsequent processing or handling of the latex. The size of the coagulated polymer particles 65 in the product slurry 66 withdrawn through the overflow chute 23 can be controlled as desired by varying the speed of blade 18. The particles 65 are generally spherical in shape and illustratively have an average diameter of about 1/16 to 3/16 inch.

The product slurry 66 withdrawn from the coagulator 16 is then sent to a conventional washing and screening operation 68 to wash contaminants out of particles 65 and separate the slurry and wash liquid 69 from the washed polymer solids 70. These solids are then sent to conventional drying equipment 71 to recover the finished polymer product 72.

The ability to control the particle size of the polymer particles 65 in slurry 66 greatly facilitates handling and transportation of the slurry, reduces fouling in the coagulator vessel, and greatly enhances the ease of the washing, separation, drying and other processing steps downstream of the coagulator. For example, the particles of polymer do not contain undesirable cores of occluded uncoagulated latex, and are easier to uniformly wash and dry. As those skilled in the art will appreciate, these are significant advantages, especially in the case of the more notoriously hard-to-handle latices such as polychloroprene latices.

RECOVERY OF POLYMER FROM SOLUTION

Recovery of a polymer from a solution in which it is dissolved is carried out in a manner substantially similar to that described previously for blood, except that blood is replaced by the polymer solution.

Referring to FIG. 3, the polymer solution 80 is introduced into the turbulent zone 40 of the coagulator beneath the agitator blade 18. A desolventizing agent, preferably steam 21, is similarly introduced to zone 40 where efficient heat and mass transfer take place between the solution 80 and steam 21. This volatilizes the solvent 82 which is then withdrawn from the vessel 16 by a steam stripping technique. The withdrawn volatilized solvent 82 can be condensed and recycled, if desired, as make-up solvent for the preparation of the polymer solution 80.

The polymer dissolved in solution 80 is preferably any polymer which can be prepared by a solution polymerization technique, with the solvent 82 of the solution being any material in which the monomer or monomers and resulting polymer and other components of the reaction mixture are soluble. Among the more common polymer solutions which can be treated in accordance with the invention are those of polyethylene, ethylene-propylene copolymer, polyisoprene, polybutadiene, natural balata rubber, styrene-butadiene rubber (SBR), and various types of copolymers. SBR is a preferred polymer solution.

Solution 80 can of course be prepared by means other than solution polymerization, for example, by dissolving the polymer solids in a suitable solvent. However, the main application of the invention is believed to be in the processing of the reaction product of a solution polymerization. Normally, solution 80 is treated in accordance with conventional procedures to remove the polymerization catalyst and unreacted monomer prior to carrying out the desolventizing technique of the invention.

The solvents in solution 80 are normally organic liquids which are substantially immiscible with water and include, for example, the various alkyl hydrocarbons such as hexane, isoctane, decane and others contained about 6 or more carbon atoms, as well as different types of aromatic and other known solvents for polymers, for example, toluene, cyclohexane and the various xylenes.

The concentration of polymer in solution can vary widely, depending upon how the solution is prepared, the type of polymer, and the particular solvent involved. Illustratively, solution 80 contains about 1 to 50%, and preferably about 2 to 20%, dissolved polymer.

Although steam is a preferred desolventizing agent, any liquid or gas capable of introducing into solution 80 enough thermal energy to volatilize the solvent contained in solution 80 could also be used, provided that in its liquid form it was not a solvent for the polymer and was otherwise compatible with the polymer. Preferably, the desolventizing agent is a gas or vapor which will condense in the coagulator to form a liquid which is substantially immiscible with the solvent in solution 80.

As the desolventizing agent and polymer solution mix in the turbulent zone 40, there is intimate mass and heat transfer between the two streams which substantially instantaneously volatilizes the solvent, throwing the dissolved polymer out of solution in the form of discrete particles 86 whose size is controlled by the speed of rotation of blade 18. This produces a slurry 88 of polymer particles 86 which is then withdrawn from the coagulator and processed in the same manner as the polymer slurry 66 in FIG. 2 to produce a final washed and dried polymer product 90. Thus slurry 88 is washed and screened 92 to wash contaminants out of the polymer particles 86 and to separate the slurry and wash liquid 93 from the washed polymer solids 94 which are then sent to drying equipment 95 to produce the finished polymer product 90.

The various process and equipment parameters discussed above such as agitator blade speed, blade tip speeds, blade diameter, clearance between the agitator blade and coagulator walls, points of introduction of the polymer solution and desolventizing agent, residence times, temperatures, the dimensions and shape of zone 40, etc. are substantially the same as described above in connection with the coagulation of blood and polymer latices.

The polymer particles 86 are of the same general configuration and particle size range as the polymer particles 65 produced in the latex coagulation shown in FIG. 2., and thus afford all the advantages previously discussed in connection with the latex coagulation aspect of the invention.

A principle advantage of the desolventizing aspect of the invention is that significantly less steam is required to vaporize and remove solvent 82 because the mass and heat transfer between the steam 21 and polymer solution 80 is so efficient. This results in a desolventizing process of reduced energy consumption.

As can now be appreciated, the process of this invention allows a polymer or protein to be continuously and substantially instantaneously coagulated or desolventized under conditions of highly efficient mass and heat transfer by carefully directing the polymer or protein and the coagulating or desolventizing agent to a localized highly turbulent zone in which the polymer or protein grows into solid particles of controlled size to produce a pumpable, flowable slurry of finely divided polymer or protein particles which can then be efficiently washed, separated and uniformly dried.

The following examples are provided to further illustrate the invention.

EXAMPLE 1

In this example, coagulated blood particles were prepared sustantially in accordance with the process shown in accompanying FIG. 1. The coagulator vessel was a 316 stainless steel cylindrical tank with an inside diameter of about 10½ inches and a height of about 15 inches. Blood was continuously injected into the bottom of the tank through a ½ inch diameter opening whose center was offset about one inch from the center of the tank bottom. Steam was continuously injected through two ½ inch diameter inlet openings in the tank wall spaced 180 degrees apart and located about 3½ inches above the tank bottom. The high shear agitator blade was a 4 inch diameter Cowles Standard Impeller design, a high shear impeller with a sawtooth pattern at its rim which was mounted on a driven shaft about 3½ inches above the tank bottom. The blade occupied about 38% of the diameter of the coagulator. The localized turbulent zone extended radially outward from the blade tip a distance of approximately one half the blade diameter (or 2 inches) so that the turbulent zone occupied about 2 inches out of the 3¼ inches between the blade tip and the wall of the coagulator, or about 64% of this distance. This sufficed to insure that substantial amounts of blood and steam did not short circuit the process by avoiding passage through the turbulent zone at the tip of the agitator blade.

The top of the coagulator was provided with a semicircular overflow device to receive the continuous overflow from the coagulator during operation. This overflow device had about a 3 inch radius and channeled the overflow to a hold tank from which it was fed to a centrifuge by a pump.

To initiate the process, the coagulator was filled with water, and steam was bubbled into the water until the temperature of the contents of the coagulator was about 200° F. While this preheating was occurring, a storage tank was filled with fresh beef blood which had not been treated with any additives. This blood was then transferred to the dilution tank where it was mixed with enough water to produce a diluted blood containing about 80% by weight raw whole blood and 20% by weight added water.

As soon as the coagulator contents were preheated to about 200° F., the centrifuge, high shear mixing blade, blood feed pump and the slurry outlet pump (see FIG. 1) were started. A vortex was produced in the coagulator causing some of the contents to spill over into the overflow device. The mixing blade was set to rotate at about 5000 RPM to produce a blade tip speed of about 5240 feet per minute. The blood and the steam were separately introduced to the zone of highly turbulent flow at the tip of the high shear blade where coagulation of the blood began to occur. Once good blood coagulation had begun as evidenced by properly sized (1/16-⅛ inch diameter) generally spherical particles in the slurry spilling into the overflow device, the speed of the blood feed pump was gradually increased until the coagulator temperature stabilized at about 195°-200° F. at which point steady state operation commenced with coagulated blood being continuously withdrawn from the coagulator and pumped to the centrifuge for recovery of the particles. Under stable operating conditions, the flow rate of diluted blood was 80 gallons per hour and the steam consumption was approximately 90 lbs/hr. The recovered blood particles were then dried in accordance with normal procedures to produce a product of generally spherical particles of dry coagulated blood, most of which had an average particle diameter of between about 1/16 and ⅛ inch.

EXAMPLE 2

Coagulted whey particles were prepared by substantially the same process as shown in accompanying FIG. 1 and described in Example 1 above except for several changes in the process noted below.

The whey used was from cottage cheese. It was fresh (5 hours out of the vat), and had a pH of 4.6, classifying it as an acid whey. The whey contained approximately 6% solids and 0.8% protein. The whey came directly from the cheese vat without further processing.

The coagulator vessel was a 316 stainless steel cylindrical tank with an inside diameter of 10½ inches and a height of about 15 inches, as previously described. Whey was continuously injected into the bottom of the vessel through a ½ inch diameter opening. Steam was continuously injected through two ½ inch diameter inlets, spaced 180 degrees apart and located 3½ inches above the vessel bottom. The high shear agitator blade remained a 4 inch diameter Cowles Standard Impeller design, but it was mounted on a driven shaft about 9 inches above the vessel bottom. The blade still occupied about 38% of the diameter of the coagulator.

To initate the process, the coagulator was filled with water, and steam was injected until the temperature reached 190° F. While pre-heating the coagulator, a storage tank was filled with fresh whey.

As soon as the coagulator contents were pre-heated, the feed pump and shear blade were started. A vortex formed causing some of the contents to spill into the overflow device. The blade was set to rotate at about 3000 RPM, producing a blade tip speed of about 3142 feet per minute.

Both whey and steam were introduced below the high shear blade. This produced a longer residence time in the coagulator, and allowed the high shear blade to be run at a lower speed. The nature of the protein and smallness of particle size was such that coagulation was not discernable in the process stream. Therefore, samples were taken at various intervals during the run. Samples were collected in 3000 milliliter beakers. The beakers permitted unobstructed observation of the coagulated particles as soon as the turbulence subsided.

Once good coagulation had begun, the whey feed was gradually increased until the coagulator temperature stabilized at 200° F. Temperature control was maintained by varying the steam input. Under stable operating conditions the flow rate of the whey was about 50 gallons per hour and the steam consumption was approximately 70 pounds per hour.

It was found that in the process of this invention, approximately 50% of the protein in raw acid whey at a pH of 4.6 could be coagulated substantially instantaneously. In the prior art process of preparing acid whey for spray drying, the raw whey is exposed to temperatures of 165° to 190° F. for 20 minutes or more to coagulate and precipitate part of the proteins.

Once the protein is coagulated it can be separated from the whey and reused in the cheese manufacturing process, or in other dairy-type products such as yogurt.

The protein could also be dried and incorporated as an additive in other foods or animal feeds.

EXAMPLE 3

In this example, a polychloroprene latex was coagulated substantially in accordance with the process shown in FIG. 2. The vessel in which the coagulation was performed was the same 316 stainless steel cylindrical tank described in Example 1.

A commercially available type WRT polychloroprene latex having a solids content of about 35% and an average particle size of about 0.11 to 0.15 microns was continuously injected into two ¼ inch diameter openings in the tank wall spaced about 180 degrees apart and located about 3½ inches above the tank bottom. A solution containing about 5% dissolved magnesium sulfate coagulating agent and about 2.5% dissolved sodium lauryl sulfate as the excess anoinic surfactant was continuously injected into the bottom of the tank through a ⅛ inch diameter orifice whose center was offset about one inch from the center of the tank bottom. The high shear agitator blade was a 4 inch diameter Cowles standard impeller design high shear impeller with a saw tooth pattern at its rim, which was mounted on a driven shaft about 3½ inches above the tank bottom. The blade occupied about 38% of the diameter of the coagulator. This blade dimension insured that substantial amounts of the latex, coagulating agent and excess anoinic surfactant did not short circuit the process by avoiding passage through the high shear turbulent zone at the top of the agitator blade. The agitator blade was set to rotate at about 5000 RPM (a tip speed of about 5240 feet per minute) and produced a vortex in the coagulator.

A 3 inch radius semi-circular opening was cut into the top vertical wall of the coagulator to provide an overflow from the coagulator during operation. This opening channeled the overflow to an inclined chute which moved the overflowing product slurry out of the coagulator. The slurry was collected from the exit chute, screened, and dried. The coagulated latex particles ranged in size from about 1/16 inch to 3/16 and were of a spherical configuration.

Start-up was accomplished by placing a few gallons of the solution containing the magnesium sulfate and sodium lauryl sulfate into the coagulator and starting the agitator blade at the desired rate of rotation. Additional solution of magnesium sulfate and sodium lauryl sulfate was then pumped continuously into the coagulator at a rate sufficient to maintain a vortex of the solution in the coagulator before the addition of latex. As soon as a steady state vortex was created, the polychloroprene latex was continuously added to the coagulation vessel through the two orifices 3½ inches above the tank bottom. The latex was introduced to the coagulation zone, i.e., the high shear turbulent zone, at the rate of about ¼ gallon per minute. As the liquid level built up in the coagulator, a slurry of coagulated latex crumb in the magnesium sulfate-sodium lauryl sulfate solution began to overflow the coagulation vessel onto the inclined chute. Operation was then continued at steady state conditions. The coagulation was conducted at substantially ambient temperatures.

EXAMPLE 4

In this example, a solution of styrene-butadiene rubber (SBR) in a volatile, substantially water-immiscible organic solvent was desolventized substantially in accordance with the process shown in FIG. 3. The vessel in which the desolventizing was performed was the same 316 stainless steel cylindrical tank described in Example 1 modified to provide for the venting and removal of the volatilized solvent. The high shear agitator blade was the same 4 inch diameter Cowles impeller described in the previous examples mounted 3½ inches above the tank bottom.

To initiate the process, the tank was filled with water and steam was continuously bubbled into the water as in Example 1 until the water temperature was about 200° to 205° F. At this point, the high shear agitator blade was started and set to rotate at about 5000 RPM, producing a vortex in the tank which caused some of the contents to spill over onto the overflow chute.

The solution of SBR was then continuously introduced into the turbulent zone at the tip of the agitator blade through two ¼ inch diameter openings in the tank wall spaced about 180 degrees apart and located at about the same level as the agitator blade. Once desolventizing had commenced as evidenced by the appearance of properly sized (1/16 to 3/16 inch diameter) generally spherical particles of SBR in the overflow slurry, the speed of the SBR solution feed pump was gradually increased until the temperature of the tank contents stabilized at about 200° to 205° F. at which point steady state operation commenced with the SBR particles being continuous withdrawn from the tank.

The specific information presented above and elsewhere in this disclosure is illustrative only and such alterations, modifications and equivalents thereof as would be apparent to those skilled in the art are deemed to fall within the scope and spirit of the invention, defined in the following claims.

What is claimed is:

1. In a process for coagulating a polymeric latex which comprises treating the latex with a coagulating agent for the latex:

the improvement which comprises agitating a mass of liquid with a high shear agitator blade operating at a tip speed of about 1500 to 6500 feet per minute to produce in the liquid a localized toroidal turbulent zone at and concentric with the tip of the agitator blade, said localized toroidal turbulent zone having an annular outer boundary and a concentric annular inner boundary below said agitator blade; introducing a first continuous stream of said latex into said localized toroidal turbulent zone through one of said boundaries; introducing a second separate and continuous stream containing said coagulating agent for said latex and an anionic surfactant into said localized toroidal turbulent zone through the remaining one of said boundaries so that said streams initially contact and mix in said turbulent zone to produce a slurry of finely divided coagulated polymer particles; and continuously withdrawing said slurry of polymer particles from said turbulent zone.

2. The process of claim 1 wherein the latex is a polychloroprene latex.

3. The process of claim 1 wherein the coagulating agent is an electrolyte.

4. In a process for recovering a polymer from a solution of said polymer which comprises treating said solution with a desolventizing agent:

the improvement which comprises agitating a mass of liquid with a high shear agitator blade operating at a tip speed of about 1500 to 6500 feet per minute to produce in the liquid a localized toroidal turbulent zone at and concentric with the tip of the agitator blade, said localized toroidal turbulent zone having an annular outer boundary and a concentric annual inner boundary below said agitator blade; introducing a first continuous stream of said solution of polymer into said localized toroidal turbulent zone through one of said boundaries; introducing a second separate and continuous stream of said desolventizing agent into said localized toroidal turbulent zone through the remaining one of said boundaries so that said streams initially contact and mix in said turbulent zone to produce a slurry of finely divided coagulated polymer particles; and continuously withdrawing said slurry of polymer particles from said turbulent zone.

5. The process of claim 4 wherein the desolventizing agent is steam.

6. The process of claim 4 wherein the polymer in said solution is selected from the group consisting of the polymers of isoprene, butadiene, and styrene-butadiene.

* * * * *